US010912295B2

(12) United States Patent
Papadopoulos

(10) Patent No.: US 10,912,295 B2
(45) Date of Patent: Feb. 9, 2021

(54) AGROCHEMICAL COMBINATION

(71) Applicant: Crop Intellect Ltd., Lincoln (GB)

(72) Inventor: Apostolos Papadopoulos, Lincoln (GB)

(73) Assignee: Crop Intellect Ltd., Lincoln (GB)

( * ) Notice: Subject to any disclaimer, the term of this patent is extended or adjusted under 35 U.S.C. 154(b) by 0 days.

(21) Appl. No.: 16/311,374

(22) PCT Filed: Mar. 12, 2018

(86) PCT No.: PCT/GB2018/050624
§ 371 (c)(1),
(2) Date: Dec. 19, 2018

(87) PCT Pub. No.: WO2018/162934
PCT Pub. Date: Sep. 13, 2018

(65) Prior Publication Data
US 2019/0230922 A1 Aug. 1, 2019

(30) Foreign Application Priority Data
Mar. 10, 2017 (GB) .................................. 1703877.9

(51) Int. Cl.
*A01N 37/06* (2006.01)
*A01N 31/06* (2006.01)
*A01N 59/06* (2006.01)

(52) U.S. Cl.
CPC ............. *A01N 37/06* (2013.01); *A01N 31/06* (2013.01); *A01N 59/06* (2013.01)

(58) Field of Classification Search
CPC ......... A01N 37/06; A01N 31/06; A01N 59/06
See application file for complete search history.

(56) References Cited

U.S. PATENT DOCUMENTS

| 5,626,849 A | * | 5/1997 | Hastings | ................ A61K 36/16 424/439 |
| 2013/0340119 A1 | | 12/2013 | Plesch et al. | |
| 2015/0166420 A1 | * | 6/2015 | Smith | ..................... C05F 11/08 71/6 |

FOREIGN PATENT DOCUMENTS

| CN | 101548674 | * | 10/2009 |
| CN | 101675804 | * | 3/2010 |
| CN | 102030595 A | | 4/2011 |
| CN | 105272599 | * | 1/2016 |
| CN | 105693413 A | | 6/2016 |
| JP | 2001335544 | * | 12/2001 |
| JP | 2002167392 | * | 6/2002 |
| WO | WO-2001/055083 A1 | | 8/2001 |
| WO | WO-2010/37714 A1 | | 4/2010 |
| WO | WO-2012/059849 A1 | | 5/2012 |

OTHER PUBLICATIONS

Kotaki, A et al., Studies on Myoinositol III on the Growth Promoting and Lipotropic Action of some Fatty Acid Esters of Myoinositol, Journal of Vitaminology, 12: 169-178, 1966.
Australian Examination Report, Australian Application No. 2018231673, dated Apr. 8, 2020.
Indian Examination Report, Indian Application No. 201937040824, dated Mar. 19, 2020.

* cited by examiner

*Primary Examiner* — Mina Haghighatian
(74) *Attorney, Agent, or Firm* — Julie K. Staple; Dinsmore & Shohl LLP

(57) ABSTRACT

The present invention relates to an agrochemical combination of (i) linolenic acid, a linolenic acid derivative, a linolenic acid breakdown component, or an ester thereof; and (ii) inositol, an inositol derivative or an inositol breakdown component. The invention also relates to agrochemical compositions comprising the same and the use such a combination for improving plant physiology.

21 Claims, No Drawings

AGROCHEMICAL COMBINATION

The present invention relates to agrochemical combinations of ingredients suitable for use in agrochemical compositions and the use of the same to improve plant physiology.

BACKGROUND TO THE INVENTION

Improving yield and quality in a sustainable manner has always been the challenge in crop farming. Crop nutrition has been key to improving crop productivity once crop protection is taken care of and it is highly supported by nutrition. Major nutrients such as nitrogen are core to increasing plant growth but increasing such nutrients can bring about negative effects. Fast cell division and expansion cause a weak plant which is more vulnerable to biotic and abiotic stresses. This results in poor plant performance and more need for inputs to reduce such negative effects. Complex interactions exist between elements which although are to an extent understood it is not easy to manage in a field situation. Typically, one element will block another or its availability will cause toxicity to the plant.

Plant characteristics associated with yield and quality are weight, size, uniformity, shelf-life, colour, sugar etc. These are highly affected by crop nutrition. Many researchers have focused on shelf-life as a major requirement in the industry particularly of perishable produce such as leafy salads.

Over the years, researchers have discovered ways to improve the application of fertilisers to plants, e.g. using more available forms, improved uptake by increasing the residual time in the soil or on plant surface, increasing the penetration of wax layers and formation of complexes to retain availability when soil applied. Furthermore, phytochemicals such as auxins, cytokinins and secondary metabolites have been used to control plant growth or trigger responses of the immune system to increase resilience to biotic stresses. Although benefits have been demonstrated using these, synergies are very rare. Combining ingredients usually results in no effect or no extra benefits most likely due to the overreaction of the plant.

The most desirable quality characteristic is the reduction of water loss which is a measure that reflects improvements in cell structural stability, cell wall strength, improved cell division and dry matter. Other characteristics include increase in fresh weight and sugars, reduced rotting and improved colour.

Improving such characteristics of the plant physiology is the object of the invention through an agrochemical combination.

DESCRIPTION OF THE INVENTION

The present invention relates to an agrochemical combination of ingredients for use in an agrochemical composition, and the use of such a combination to improve plant physiology, to improve crop yields, and/or to improve crop quality characteristics.

In a first aspect, the invention provides a combination of:
(i) linolenic acid, a linolenic acid derivative, a linolenic acid breakdown component, or an ester thereof; and
(ii) inositol, an inositol derivative or an inositol breakdown component.

Component (i) is a linolenic acid, a linolenic acid derivative, a linolenic acid breakdown component, or an ester thereof.

Linolenic acid is a type of fatty acid. It can refer to either of two octadecatrienoic acids, i.e. with an 18 carbon chain and three double bonds which are found in the cis configuration, or a mixture of the two. The two forms of linolenic acid are α-linolenic acid and or γ-linolenic acid.

α-linolenic acid is represented by the chemical structure:

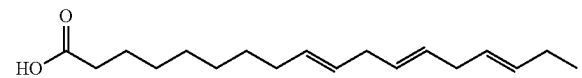 [SMILES: CC/C=C/C/C=C/C/C=C/CCCCCCCC(=O)O]

γ-linolenic acid is represented by the chemical structure:

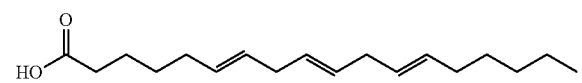 [SMILES: CCCCC/C=C/C/C=C/C/C=C/CCCCC(=O)O]

Component (i) may also be a linolenic acid derivative or ester thereof.

Linolenic acid and its derivatives can be represented by Formula 1.

In one embodiment, component (i) is a compound of Formula 1:

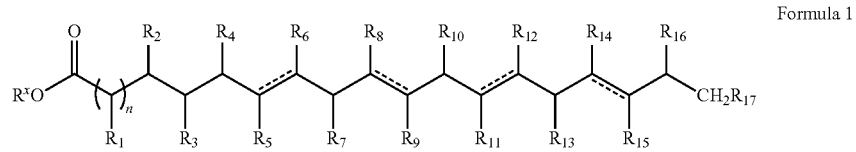

Formula 1 wherein:
$R_{1-16}$ are independently selected from H, F, Br, Cl, I, cyano, $NO_2$, $C_1$-$C_3$ alkyl, $CH_2OH$, $CH_2OCH_3$, $C_1$-$C_3$ alkoxy, $C_1$-$C_3$ haloalkyl, —$NR^{18}R^{19}$, —$C(=O)R^{19}$, $CH_2COOR^{19}$, or $OR^{19}$;

$R_{17}$ is independently selected from H, F, Br, Cl, I, cyano, $NO_2$, and —$NH_2$;

$R^{18}$ and $R^{19}$ are independently selected from H and $C_1$-$C_3$ alkyl;

$R^x$ is independently selected from H, methyl, ethyl, propyl, n-butyl, iso-butyl, sec-butyl, t-butyl, n-pentyl, iso-pentyl, neo-pentyl, t-pentyl, 2-methylbutyl, benzyl, phenyl, hexyl, 3-methylpentyl, octyl, 2-ethylhexyl, nonyl, decyl, undecyl, dodecyl, allyl, propargyl, 2-methyl-2-propenyl, cis-3-hexenyl, neryl, linalyl, citronellyl, 2-methyl-2-butenyl, trans-3-hexenyl, 3-methyl-2-butenyl, β-phenylethyl, α-phenylethyl and furfuryl;

n is 0-2; and
each ---- is a single or double bond, provided that at least two ---- are double bonds.

In one embodiment, at least 12, at least 13, at least 14, at least 15, or at least 16 of $R_{1-17}$ are H.

In one embodiment, $R_{17}$ is H and at least 14 or at least 15 of $R_{1-16}$ are H.

In one embodiment, all of $R_{1-17}$ are H. For example, $R_{1-17}$ and $R_x$ may all be H.

In one embodiment, two --- are double bonds.

In one embodiment, $R^x$ is H, methyl, ethyl, propyl, n-butyl, iso-butyl, sec-butyl, t-butyl, n-pentyl, iso-pentyl, neo-pentyl, t-pentyl, 2-methylbutyl, or phenyl.

Component (i) may also be a linolenic acid breakdown component or derivatives thereof. Linolenic acid breakdown components and derivatives thereof may be represented by Formulae 2 to 5:

Formula 2

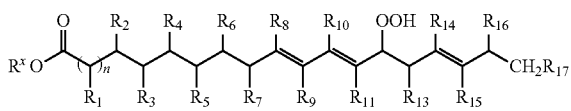

Formula 3

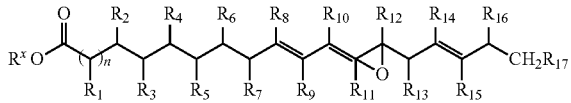

Formula 4

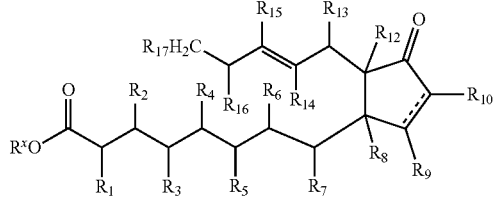

Formula 5

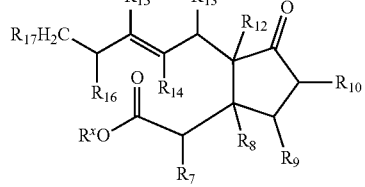

wherein:

$R_{1-16}$ are independently selected from H, F, Br, Cl, I, cyano, $NO_2$, $C_1$-$C_3$ alkyl, $CH_2OH$, $CH_2OCH_3$, $C_1$-$C_3$ alkoxy, $C_1$-$C_3$ haloalkyl, —$NR^{18}R^{19}$, —C(=O)$R^{19}$, $CH_2COOR^{19}$, or $OR^{19}$;

$R_{17}$ is independently selected from H, F, Br, Cl, I, cyano, $NO_2$, and —$NH_2$;

$R^{18}$ and $R^{19}$ are independently selected from H and $C_1$-$C_3$ alkyl;

$R^x$ is selected from H, methyl, ethyl, propyl, n-butyl, iso-butyl, sec-butyl, t-butyl, n-pentyl, iso-pentyl, neo-pentyl, t-pentyl, 2-methylbutyl, benzyl, phenyl, hexyl, 3-methylpentyl, octyl, 2-ethylhexyl, nonyl, decyl, undecyl, dodecyl, allyl, propargyl, 2-methyl-2-propenyl, cis-3-hexenyl, neryl, linalyl, citronellyl, 2-methyl-2-butenyl, trans-3-hexenyl, 3-methyl-2-butenyl, β-phenylethyl, α-phenylethyl and furfuryl;

wherein n is 0-2; and wherein --- may be a single or double bond.

In one embodiment, component (i) is a compound of formula 6 or formula 7:

Formula 6

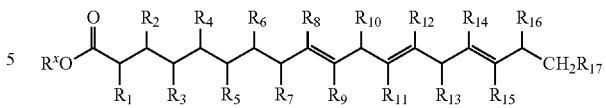

Formula 7

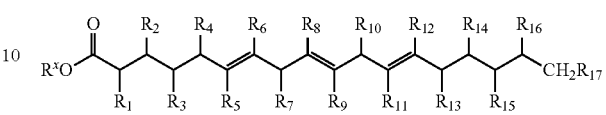

wherein $R_{1-17}$ and $R^x$ are as defined previously.

With respect to all of Formulae 1 to 7, $R_{1-16}$ may be independently selected from H, F, Br, Cl, I, cyano, $NO_2$, OH, $C_1$-$C_3$ alkyl, $CH_2OH$, or $CH_2OCH_3$. For example, $R_{1-16}$ may be independently selected from H, F, Br, Cl, I, or OH.

With respect to all of Formulae 1 to 7, $R_{17}$ may be H, F, Br, Cl, I, or $NH_2$. For example $R_{17}$ is H.

In some embodiments, $R_{1-16}$ are independently selected from H, F, Br, Cl, I, cyano, $NO_2$, $C_1$-$C_3$ alkyl, $C_1$-$C_3$ alkoxy, $C_1$-$C_3$ haloalkyl, —$NR^{18}R^{19}$ or $OR^{19}$; $R^{18}$ and $R^{19}$ are independently selected from H and $C_1$-$C_3$ alkyl; and $R_{17}$ is selected from H, F, Br, Cl, I, cyano, $NO_2$, $C_1$-$C_3$ alkyl, $C_1$-$C_3$ alkoxy, $C_1$-$C_3$ haloalkyl, —$NR^{18}R^{19}$ or $OR^{19}$.

In some embodiments, $R_{1-16}$ are independently selected from H, F, Br, Cl, I, cyano, $NO_2$, —$NR^{18}R^{19}$ or $OR^{19}$; $R^{18}$ and $R^{19}$ are independently selected from H and $C_1$-$C_3$ alkyl; and $R_{17}$ is selected from H, F, Br, Cl, I, cyano, $NO_2$, —$NR^{18}R^{19}$ or $OR^{19}$.

In some embodiments, $R_{1-16}$ are independently selected from H, F, Br, Cl or I; and $R_{17}$ is selected from H, F, Br, Cl or I.

In some embodiments, $R_{1-16}$ are H; and $R_{17}$ is H.

In some embodiments, $R^x$ is selected from H, methyl, ethyl, propyl, n-butyl, iso-butyl, sec-butyl, t-butyl, n-pentyl, iso-pentyl, neo-pentyl, t-pentyl, 2-methylbutyl, benzyl, phenyl, hexyl or 3-methylpentyl.

In some embodiments, $R^x$ is selected from H, methyl, ethyl, propyl, n-butyl, iso-butyl, sec-butyl, t-butyl, n-pentyl, iso-pentyl, neo-pentyl, t-pentyl or 2-methylbutyl.

In some embodiments, $R^x$ is selected from H, methyl, ethyl, propyl, n-butyl, iso-butyl, sec-butyl or t-butyl.

In some embodiments, $R^x$ is selected from H, methyl, ethyl or propyl.

In one embodiment, $R^x$ is selected from H, methyl or ethyl.

In one embodiment, $R^x$ is H or methyl.

In one embodiment, $R_{1-16}$ are independently selected from H, F, Br, Cl or I; $R_{17}$ is selected from H, F, Br, Cl or I; and at least 15 of $R_{1-17}$ are H.

In one embodiment, component (i) is α-linolenic acid:

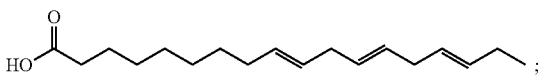 [SMILES: CC/C=C/C/C=C/C/C=C/CCCCCCCC(=O)O]

or γ-linolenic acid:

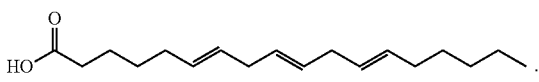 [SMILES: CCCCC/C=C/C/C=C/C/C=C/CCCCC(=O)O]

In one embodiment, component (i) is linolenic acid or an ester thereof such as a $C_{1-4}$ alkyl ester thereof, e.g. an ethyl ester thereof.

Component (i) may be applied to a plant dissolved in a solvent. A suitable solvent is water.

The concentration of component (i) may be from about 0.1 mg/litre (mg/l) to about 500 mg/l, from about 0.3 mg/l to about 300 mg/l, from about 0.4 mg/l to about 125 mg/l, from about 0.5 mg/l to about 100 mg/l, from about 0.6 mg/l to about 75 mg/l, from about 0.7 mg/l to about 50 mg/l, or from about 0.8 mg/l to about 35 mg/l. For example, the concentration of component (i) may be from about 1 mg/l to about 33 mg/l. For example, the concentration of component (i) may be about 1 mg/l, about 4.5 mg/l, about 4.9 mg/l, about 30 mg/l, or about 33 mg/l.

Alternatively, the concentration of component (i) may be from about 10 mg/litre (mg/l) to about 500 mg/l, from about 50 to about 300 mg/l, from about 75 to about 125 mg/l, or from about 90 to about 110 mg/l. For example, the concentration of component (i) may be about 100 mg/l.

When applied to the plant, component (i) may be applied in amount from about 0.01 g/ha to about 10.0 g/ha, from about 0.02 g/ha to about 9.0 g/ha, from about 0.03 g/ha to about 8.0 g/ha, from about 0.05 g/ha to about 6.0 g/ha, or from about 0.1 g/ha to about 4.5 g/ha.

Component (ii) is inositol, an inositol derivative or an inositol breakdown component.

Innositol is also known as cyclohexane-1,2,3,4,5,6-hexol and has a chemical structure:

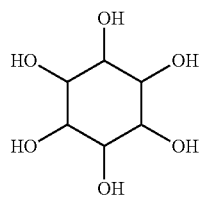

Inositol includes but is not limited to the following isomers: myo-, scyllo-, muco-, chiro-, neo-, allo-, epi, and cis-inositol. Chiro-inositol may be one of two forms: D-chiro-inositol or L-chiro-inositol.

Component (ii) may also be an inositol derivative or an inositol breakdown component. Inositol derivatives and inositol breakdown components may be represented by Formula 8. In one embodiment, component (ii) is a compound represented by formula 8:

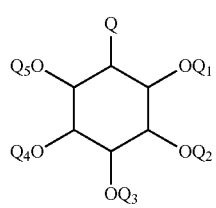

Formula 8 wherein:
Q may be selected from $OQ_6$ or H, halogen, cyano, $NO_2$, $C_1$-$C_3$ alkyl, $C_1$-$C_3$ haloalkyl, and amino; and
$Q_1$-$Q_6$ are independently selected from H, —$PO_3H_2$, —$SO_3H$, $C_1$-$C_3$ alkyl, formula 9:

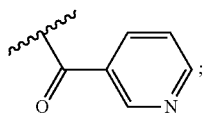

Formula 9 and
two or more of Q1 and Q2, Q3 and Q4, Q5 and Q6 may together form a group represented by formula 10; and

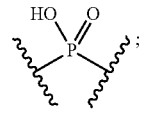

Formula 10 wherein when one or more of $Q_1$-$Q_6$ is $C_1$-$C_3$ alkyl, the alkyl group(s) may also join to the carbon atom of the inositol ring structure thereby forming a cyclic ether group.

In one embodiment, Q is $OQ_6$, wherein $Q_6$ is as defined herein.

In one embodiment, $Q_3$, $Q_4$, and $Q_5$ are H, and Q, $Q_1$, and $Q_2$ are as defined herein.

In one embodiment, $Q_2$, $Q_3$, $Q_4$, and $Q_5$ are H, and Q, and $Q_1$ are as defined herein.

In one embodiment, $Q_1$-$Q_5$ are H, and Q is as defined herein.

In one embodiment, $Q_1$-$Q_5$ are H, and Q is OQ6 or H, halogen, cyano, $NO_2$, $C_1$-$C_3$ alkyl, $C_1$-$C_3$ haloalkyl, and amino. For example, Q may be $OQ_6$. Alternatively, Q may be H, halogen or amino.

As used herein, the term inositol is intended to mean any stereoisomer of inositol. For example, myo-inositol, D-chiro-inositol, L-chiro-inositol, muco-inositol, scyllo-inositol, neo-inositol, allo-inositol, epi-inositol, cis-inositol or mixtures thereof.

In one embodiment, component (ii) is selected from inositol, an inositol phosphate, an inositol sulphate, an inositol nicotinate/niacinate, or a cyclic ether inositol.

In some embodiments, component (ii) is selected from inositol, an inositol phosphate or an inositol sulphate.

In one embodiment, component (ii) is inositol. For example, component (ii) may be selected from myo-inositol, D-chiro-inositol, L-chiro-inositol, muco-inositol, scyllo-inositol, neo-inositol, allo-inositol, epi-inositol and cis-inositol.

In some embodiments, component (ii) is selected from myo-inositol and D-chiro-inositol.

Component (ii) may be applied to a plant dissolved in a solvent. A suitable solvent is water.

The concentration of component (ii) may be from about 10 mg/litre (mg/l) to about 500 mg/l, from about 50 to about 300 mg/l, from about 100 mg/l to about 150 mg/l. For example, the concentration of component (ii) may be about 100 mg/l or 150 mg/l.

When applied to the plant, component (ii) may be applied in amount from about 1 to about 80 g/hectare (ha), from about 5 to about 50 g/ha, from about 10 g/ha to about 20 g/ha, or from about 5 to about 15 g/ha. For example, component (ii) may be applied in an amount of about 10 g/ha or about 15 g/ha.

In one embodiment, the combination of (i) and (ii) further comprises a source of calcium.

The source of calcium may be selected from but not limited to the group consisting of calcium ammonium nitrate, calcium nitrate, calcium hydroxide, calcium cyanamide, calcium acetate, calcium acetylsalicylate, calcium borate, calcium borogluconate, calcium carbonate, calcium chloride, calcium citrate, calcium ferrous citrate, calcium glycerophosphate, calcium lactate, calcium oxide, calcium pantothenate, calcium propionate, calcium saccharate, calcium sulphate, calcium phosphate and calcium tartrate.

The source of calcium may be applied to a plant dissolved in a solvent. A suitable solvent is water.

The concentration of the calcium source may be from about 0.025 wt % to about 20 wt %, from about 0.04 wt % to about 1 wt %, from about 0.05 wt % to about 0.25 wt %, or from about 0.1 wt % to about 0.2 wt %

When applied to the plant, the source of calcium may be applied in amount from about 1 g to about 200 kg/hectare (ha), from about 200 g to about 1 kg/ha, from about 400 to about 80000 g/ha, or about 600 g/ha.

In some embodiments, the combination of (i) and (ii) further comprises an active ingredient selected from the group consisting of harpin, systemin, oligouronides, chitosan, carbanilide, calreticulin, flagellin and β-glucan-containing elicitors.

The combinations/compositions of the invention may further comprise other conventional agrochemical ingredients such agrochemical nutrients (such as macro and micro nutrients), and agro-chemically acceptable excipients. Suitable macro nutrients include but are not limited to sources of nitrogen, phosphorous, potassium, and sulphur. Suitable micro nutrients include but are not limited to sources of magnesium and iron. Others include boron, cobalt, chromium, copper, fluoride, iodine, manganese, molybdenum, selenium, zinc etc.

Accordingly, the combinations/compositions of the invention may further comprise one or more agrochemically acceptable excipients. Examples of such components include water, amino acids, vitamins, seaweed and other plants extracts, weak acids, plant oils, essential oils, metabolic stimulating agents, emulsifiers, thickeners, colouring agents, suspension agents, dispersion agents, carriers or excipients and wetting agents.

As used herein, the expression "weak acid" refers to a weak organic acid such as acetic acid, citric acid, humic acid, fulvic acid or propanoic acid; preferably the weak acid is citric acid.

In a further aspect, the invention provides an agrochemical composition comprising a combination of (i) and (ii) as defined herein, and optionally one or more agrochemical excipients.

In this case, if required an emulsifier may be employed in the formulation. An emulsifier may be employed to improve the dissolvability of component (i) in the formulation. Suitable emulsifiers for use in the compositions of the present invention include any known agriculturally acceptable emulsifier. In particular, the emulsifier may comprise a surfactant such as: fatty alcohol polyethylene glykol ether, typically alkylaryl sulphonates, ethoxylated alcohols, polyalkoxylated butyl ethers, calcium alkyl benzene sulphonates, polyalkylene glycol ethers and butyl polyalkylene oxide block copolymers as are known in the art. Nonyl phenol emulsifiers such as Triton N57™ are particular examples of emulsifiers, which may be used in the compositions of the invention, as are polyoxyethylene sorbitan esters such as polyoxyethylene sorbitan monolaurate (sold by ICI under the trade name "Tween™"). In some instances, natural organic emulsifiers may be preferred, particularly for organic farming applications. Coconut oils such as coconut diethanolamide is an example of such an compound. Palm oil products such as lauryl stearate may also be used. Suitable emulsifiers include commercially available sorbitol products such as Tween® 20, 40, and 60.

The combination/compositions may further comprise a growth regulator.

In one embodiment, the growth regulator, or plant growth regulator, is chosen from the group of plant hormones, or chemical compounds with analogous activity. Suitable examples of such compounds are auxins, cytokines, gibberlins, ethylene precursors (like ethephon), or abscisic acid. In another embodiment, the growth regulator, or plant growth regulator, is a growth inhibitor, like for example chlormequat or mepiquat chloride, certain triazole or triazole like compounds, or prohexadione, daminozide, trinexapac ethyl type compounds, or ethylene inhibitors.

Suitable auxins include natural or synthetic chemicals that behave like the naturally occurring auxins produced by plant enzyme systems, and the term "auxin" and "auxins" as used herein refers to such compounds in natural and synthetic form. Indoleacetic acids, indol-3-butyric acid (3-BA); naphthaleneacetamide; 2 methyl-1-naphthaleneacetic acid and 2-methyl-1-naphthylacetamide have hormonal activity and may be substituted for the naturally occurring auxins. It may be useful to have metal ions present with the auxins, such as for example zinc or manganese. In preferred embodiments, the auxin employed is selected from the group consisting of 3-indolebutyric acid, 3-indoleacetic acid, 1-naphthylacetic acid, 3-indolebutyric acid, and salts and esters thereof. Preferably, the metal ions required for a good activity are supplied together with the auxin.

Suitable cytokinins are a class of plant regulation substances (phytohormones) that promote cell division, or cytokinesis, in plant roots and shoots. There are two types of cytokinins: adenine-type cytokinins represented by kinetin, zeatin, and 6-benzylaminopurine (also referred to as BAP, 6-BAP, or 6-benzyladenine), and phenylurea-type cytokinins like diphenylurea (DPU), diphenylthiourea (DPTU) and thidiazuron (TDZ). In preferred embodiments the cytokinin is selected from the group consisting of kinetin (synthetic or derived from seaweed), 6-BAP, 1-(2-chloropyridin-4-yl)-3-phenylurea (CPPU), and TDZ.

The formulations according to the invention can be applied either as such or after prior dilution with water, or other diluents, i.e. for example, as emulsions, suspensions, solutions, or aerosols.

In a particular preferred embodiment, the formulation is in the form of a concentrate which is diluted with solvent, e.g. water, prior to the actual application. In another embodiment, the formulation is in the form of a diluted formulation containing additional solvent, e.g. water, but retaining the same ratio/proportion of active ingredients found in the concentrate.

The weight ratio of component (i) to component (ii) may generally be from about 2:1 to about 1:1200, from about 1:1 to about 1:160, from about 1:2 to about 1:140, or from about 1:3 to about 1:120.

The weight ratio of component (i) to the calcium source may generally be from about 1:4,000 to about 1:550,000, from about 1:5,000 to about 1:400,000, from about 1:6,000 to about 1:300,000, or from about 1:6,500 to about 1:240,000.

The weight ratio of component (ii) to the calcium source may generally be from about 1:500 to about 1:4,000, or from about 1:1,000 to about 1:3,000, or from about 1:1,500 to about 1:2,500. For example, the weight ratio of component (ii) to the calcium source may be about 1:2,000.

In a further aspect, the invention provides the use of a combination of the present invention or an agrochemical composition of the present invention for improving plant physiology. The combination of components (i) and (ii) of the present invention has been found to have surprising efficacy for improving plant physiology. In particular, the present invention has been shown to be useful in improving plant physiology in vegetable, fruit and flowering plants. For example, the present invention has been shown to be useful in improving plant physiology in lettuce, tomato, strawberry and potato plants.

In a further aspect, the invention provides the use of a combination of the present invention or an agrochemical composition of the present invention for improving crop yield and/or crop characteristics. The combination of components (i) and (ii) of the present invention has been found to have surprising efficacy for improving crop yield and/or crop characteristics. In particular, the present invention has been shown to be useful in improving crop characteristics in vegetable, fruit and flowering plants. For example, the present invention has been shown to be useful in improving crop characteristics in lettuce, tomato, strawberry and potato plants.

In a further aspect, the invention provides the use of a combination of the present invention or an agrochemical composition of the present invention for reducing water loss in crops. The combination of components (i) and (ii) of the present invention has been found to have surprising efficacy for reducing water loss in crops. In particular, the present invention has been shown to be useful in reducing water loss in vegetable, fruit and flowering plants. For example, the present invention has been shown to be useful in reducing water loss in crops harvested from leaf vegetable plants and fruit plants, e.g. from reducing water loss in lettuce and reducing water loss in tomatoes.

In a further aspect, the invention provides the use of a combination of the present invention or an agrochemical composition of the present invention for increasing sugar content in crops. The combination of components (i) and (ii) of the present invention has been found to have surprising efficacy for improving sugar content in crops. In particular, the invention has been found useful for increasing sugar content in fruit crops. For example, the present invention has been shown to be useful in increasing sugar content in tomatoes.

In a further aspect, the invention provides the use of a combination of the present invention or an agrochemical composition of the present invention for increasing the proportion of dried matter in crops. The combination of components (i) and (ii) of the present invention has been found to have surprising efficacy for increasing dried matter in crops. In particular, the present invention has been shown to be useful for increasing the proportion of dried matter in fruit and salad crops. For example, the present invention has been shown to be useful in increasing dried matter in tomatoes.

In a further aspect, the invention provides the use of a combination of the present invention or an agrochemical composition of the present invention for reducing rotting in crops. The combination of components (i) and (ii) of the present invention has been found to have surprising efficacy for reducing rotting in crops. In particular, the present invention has been shown to be useful in reducing rotting in fruit, e.g. soft fruit such as strawberries.

In a further aspect, the invention provides the use of a combination of the present invention or an agrochemical composition of the present invention for reducing bruising in crops. The combination of components (i) and (ii) of the present invention has been found to have surprising efficacy for reducing bruising in crops. In particular, the present invention has been shown to be useful in reducing bruising in root vegetables, such as tubers, e.g. potatoes.

According to one aspect, the invention provides the use of a combination as defined herein or an agrochemical composition as defined herein for:
   (a) improving shelf life of a crop;
   (b) improving stress tolerance of a crop;
   (c) increasing fresh and dry matter content of a crop;
   (d) improving fruit conformity; and/or
   (e) increasing tolerance of a crop to disease.

The compositions of the invention may further comprise other conventional agrochemical ingredients and agrochemical excipients. Suitable agrochemical ingredients and excipients include but are not limited to macro-nutrients, micro-nutrients (also called phyto-nutrients), vitamins, amino acids, formulation aids (adjuvants), complex agents, plant growth regulators and plant protection actives.

Accordingly, the compositions of the invention may further comprise one or more agrochemical excipients.

Component (i) and component (ii) may be applied to plants simultaneously or sequentially. For example, when the components are applied simultaneously the components can be applied as part of an agrochemical composition comprising component (i) and component (ii). Alternatively, when the components are applied sequentially, the components are applied individually and the combination of the invention is formed in situ.

Each component, either combined or individually, or the combination of components described herein (including as agrochemical compositions) may be applied to plants, in particular crop plants, in any conventional manner, e.g. by soil, water, growth medium, seed treatment, gel, fumigation or foliar application. In some embodiments, foliar application is preferred. The components/combinations of the invention may be applied to root systems, stems, seeds, grains, tubers, flowers, fruit, etc. as required. Examples of means of application include spraying, e.g. by means of an electrostatic or other conventional sprayer, or drip irrigation methods or fertigation systems, which involve application directly to the soil, so as to allow magnesium and/or iron uptake through the roots.

The components/combinations/compositions of the invention may be adapted for the means of application, e.g. prepared in a form suited to the required means of application. These adaptations may take the form of liquid or solid concentrates, which require dilution before application. The components/combinations/compositions may be formed into, for example, water dispersible granules, slow or fast release granules, soluble concentrates, oil miscible liquids, ultra low volume liquids, emulsifiable concentrates, dispersible concentrates, oil in water, and water in oil emulsions, micro-emulsions, suspension concentrates, aerosols, capsule suspensions and seed treatment formulations.

The components/combinations/compositions of the present invention may be prepared using any conventional techniques and methods; for example preparing granules, dispersible concentrates, and suspension concentrates.

The invention also relates to a formulation for administration to plants or to the environment of plants, the formulation comprising a composition according to the invention and a medium in which the composition may be dispersed or dissolved.

The combinations and compositions of the invention are suitable for use on most crops, but in particular can be used for the treatment of greenhouse crops, vegetables, and fruit crops. For example, the combinations and compositions of the invention may be used on but not limited to cereals, oil seed rape, potatoes, sugar beet, vegetable crops, leafy vegetables (such as lettuce), fruits (such as tomatoes and strawberries), cucurbits and grassland.

The amount of composition or formulation applied in any particular situation will vary depending upon a number or factors such as the crop species, the farming system and practice at the region, season, soil and other inputs. Applications timing and dosage are important and dependent on plant growth and development stages.

As used herein, the term $C_1$-$C_3$ alkyl is intended to mean substituted or unsubstituted hydrocarbon groups with a carbon chain length of between 1 and 3.

As used herein, the term $C_1$-$C_3$ haloalkyl is intended to mean hydrocarbon groups with a carbon chain length of between 1 and 3, wherein at least one hydrogen atom has been substituted for a halogen atom (e.g. F, Br, Cl or I).

As used herein, the term "substituted" means substituted with a substituent selected from a halogen (F, Br, Cl or I), a hydroxy group, an alkoxy group, a nitro group, a cyano group, an amino group, an azido group, an amidino group, a hydrazino group, a hydrazono group, a carbonyl group, a carbamyl group, a thiol group, a carboxyl group or a salt thereof and a combination thereof.

The invention will now be particularly described by way of the following non-limiting examples.

EXAMPLES

The following abbreviations are used herein:
CaN Calcium nitrate obtained from Sigma Aldrich
IN Inositol obtained from Sigma Aldrich
LA Linolenic acid obtained from Sigma Aldrich
Linolenate Ethyl linolenate obtained from Sigma Aldrich
Mg/l means the same as mg/lt, i.e. milligrams per litre.

Each formulation was diluted in distilled water.
The formulations were prepared by adding the individual components to water, followed by mixing. The formulations were then further diluted in distilled water (further information below).

Each formulation was first prepared as a 2 litre stock solution. Each 2 litre stock solution was then applied per hectare (i.e. 2 litre/ha) having been diluted further with distilled water to a total volume of 150 litres.

Example 1 (Lettuce)

The formulations were applied at 2 lt/ha equivalent (diluted in 150 lt of water) to cover an area of 10,000 m². 16 plants per m² receiving 15 ml or 0.938 ml per plant. A flat fan nozzle at 110° was used to spray the plant's foliage.

The following treatments were tested on mechanically planted lettuce for uniformity. Water loss (%) was measured as an indicator of shelf-life. The shelf-life of the lettuce was measured by allowing a harvested lettuce (cut in half) to dry at ambient temperature for 72 hours. The weight of the lettuce was measured before and after drying, and the weight loss calculated; this represents water loss. 10 replicates were used for each treatment and the plants were under controlled greenhouse condition to avoid external parameters affecting the results. Distilled water was used for all treatments. Samples were collected 5 days after application.

The results are reported in Table 1 and Table 2.

The statistical significance is measured by comparing the standard error of difference of the means. If the difference between the means is higher than the LSD (least significant difference) then the difference is statistically significant. In normalised datasets the LSD is near the standard error of difference multiplied by 2. For the statistics in this study Genstat was used to analyse the data statistically.

The concentrations below indicate the concentration of each component in the diluted (150 litre) formulation. The concentration of linolenic acid is the amount required to apply a 100 nmol dose of linolenic acid per plant (based on 160,000 lettuce plants per hectare).

TABLE 1

| Treatment | Content (ai) | Conc. | Water loss (%) |
|---|---|---|---|
| Control | Water | 100% | 29.0 |
| Treatment 1.1 | Inositol (IN) | 100 mg/lt | 27.3 |
| Treatment 1.2 | Linolenic Acid (LA) | 30 mg/lt | 26.1 |
| Treatment 1.3 | LA | 100 mg/lt | 21.4 |
|  | IN | 30 mg/lt |  |
|  |  | LSD | 3.9 |

The results of the trial reported in Table 1 show that lettuce treated with a combination of linolenic acid and inositol (treatment 1.3) exhibited significantly lower water loss during the period of the test compared to linolenic acid and inositol alone (treatments 1.2 and 1.1 respectively). In particular, using linolenic acid and inositol alone (treatments 1.2 and 1.1 respectively) produced no statistically significant improvement over control. In contrast, the combination of linolenic acid and inositol (treatment 1.3) exhibited a statistically significant improvement over the control and over either active ingredient alone. The performance of the combination was therefore unexpected.

The concentrations below indicate the concentration of each component in the diluted (150 litre) formulation. The concentration of linolenic acid is the amount required to apply a 100 nmol dose of linolenic acid per plant (based on 160,000 lettuce plants per hectare). The concentration of CaN is a result of diluting a 20 wt % CaN stock solution to 150 litres.

TABLE 2

| Treatment | Content (ai) | Conc. | Water loss (%) |
|---|---|---|---|
| Control (+) | Ca Nitrate 4H2O (CaN) | 0.13 wt % | 26.9 |
| Treatment 2.1 | CaN | 0.13 wt % | 25.2 |
|  | IN | 100 mg/lt |  |
| Treatment 2.2 | CaN | 0.13 wt % | 24.5 |
|  | LA | 30 mg/lt |  |
| Treatment 2.3 | CaN | 0.13 wt % | 17.7 |
|  | IN | 100 mg/lt |  |
|  | LA | 30 mg/lt |  |
|  |  | LSD | 3.9 |

Likewise, the results of the trial reported in Table 2 show that lettuce treated with a combination of linolenic acid and inositol (in the presence of calcium nitrate) (treatment 2.3) exhibited significantly lower water loss during the period of the test compared to linolenic acid and inositol alone (in the presence of calcium nitrate) (treatments 2.2 and 2.1 respectively). In particular, using linolenic acid and inositol alone (in the presence of calcium nitrate) (treatments 2.2 and 2.1 respectively) produced no statistically significant improvement over control (+). In contrast, the combination of linolenic acid and inositol (in the presence of calcium nitrate) (treatment 2.3) exhibited a statistically significant improvement over the control (+) and over either active ingredient alone. The performance of the combination was therefore unexpected.

The formulations above were also tested on lettuce when applying at 1 lt/ha, 2 lt/ha, 3 lt/ha, 4 lt/ha and 5 lt/ha as a dose finding exercise. All doses produced similar results with that of 2 lt/ha providing the highest comparatively.

The ratio used (100 mg/lt inositol and 30 mg/lt LA) was chosen after tests on lettuce using inositol at 10 mg/lt, 100 mg/lt and 500 mg/lt and LA at 3.0 mg/lt, 30 mg/lt and 150 mg/lt showed that the synergistic activity was retained at all doses and all ratios, with the highest results obtained when 100 mg/lt inositol was combined with 30 mg/lt LA. The other combinations were also superior to the ingredients on their own.

Example 2 (Tomatoes)

Plants were sprayed three times, first at flowering, then when fruit size was 2-3 mm and again when fruit size was 20 mm diameter. This was applied at 2 lt/ha equivalent diluted in 150 lt of water to cover an area of 10,000 m$^2$. Measurements were taken from the middle of the season so the fruits were not the first fruits produced.

The methodology for water loss analysis was the same as that for Example 1 above.

Sugar content was analysed using a refractometer using the sap.

Dry matter results were obtained in the following way. The freshly harvested tomatoes were weighted, and then oven-dried at 45-50° C. for 48 hours. The oven-dried tomatoes were then weighed. Dry matter percentage (%) is weight of is freshly harvested tomatoes/weight of oven-dried tomatoes×100.

The results are reported in Table 3 and Table 4.

The concentrations below indicate the concentration of each component in the diluted (150 litre) formulation. The concentration of linolenic acid is the amount required to apply a 100 nmol dose of linolenic acid per plant (based on 4,500 tomato plants per hectare). The concentration of CaN is a result of diluting a 20 wt % CaN stock solution to 150 litres.

TABLE 3

| Treatment | Content (ai) | Conc. | Water loss (%)* | Dry Matter (%) |
|---|---|---|---|---|
| Control | Water | 100% | 4.0 | 6.3 |
| Treatment 3.1 | Inositol (IN) | 100 mg/lt | 4.0 | 6.2 |
| Treatment 3.2 | Linolenic Acid (LA) | 0.84 mg/lt | 3.9 | 6.4 |
| Treatment 3.3 | LA | 100 mg/lt | 3.7 | 6.9 |
|  | IN | 0.84 mg/lt |  |  |
|  |  | LSD | 0.168 | 0.4 |

The results of the trial reported in Table 3 show that tomatoes treated with a combination of linolenic acid and inositol (treatment 3.3) exhibited significantly lower water loss during the period of the test compared to linolenic acid and inositol alone (treatments 3.2 and 3.1 respectively). In particular, using linolenic acid and inositol alone (treatments 3.2 and 3.1 respectively) produced no statistically significant improvement over control. In contrast, the combination of linolenic acid and inositol (treatment 3.3) exhibited a statistically significant improvement over the control and over either active ingredient alone. The performance of the combination was therefore unexpected.

In addition, the results reported in Table 3 show that tomatoes treated with a combination of linolenic acid and inositol (treatment 3.3) exhibited significantly greater dry matter (%) compared to linolenic acid and inositol alone (treatments 3.2 and 3.1 respectively). In particular, using linolenic acid and inositol alone (treatments 3.2 and 3.1 respectively) produced no statistically significant improvement over control. In contrast, the combination of linolenic acid and inositol (treatment 3.3) exhibited a statistically significant improvement over the control and over either active ingredient alone. The performance of the combination was therefore unexpected.

The concentrations below indicate the concentration of each component in the diluted (150 litre) formulation. The concentration of linolenic acid is the amount required to apply a 100 nmol dose of linolenic acid per plant (based on 4,500 tomato plants per hectare). The concentration of CaN is a result of diluting a 20 wt % CaN stock solution to 150 litres.

TABLE 4

| Treatment | Content (ai) | Conc. | Water loss (%)* | Sugar |
|---|---|---|---|---|
| Control (+) | Ca Nitrate 4H2O (CaN) | 0.13 wt % | 3.3 | 2.6 |
| Treatment 4.1 | CaN | 0.13 wt % | 3.4 | 2.3 |
|  | IN | 100 mg/lt |  |  |
| Treatment 4.2 | CaN | 0.13 wt % | 3.4 | 2.5 |
|  | LA | 0.84 mg/lt |  |  |
| Treatment 4.3 | CaN | 0.13 wt % | 3.0 | 2.8 |
|  | IN | 100 mg/lt |  |  |
|  | LA | 0.84 mg/lt |  |  |
|  |  | LSD | 0.168 | 0.28 |

Likewise, the results of the trial reported in Table 4 show that tomatoes treated with a combination of linolenic acid and inositol (in the presence of calcium nitrate) (treatment 4.3) exhibited significantly lower water loss during the period of the test compared to linolenic acid and inositol alone (in the presence of calcium nitrate) (treatments 4.2 and 4.1 respectively). In particular, using linolenic acid and inositol alone (in the presence of calcium nitrate) produced no statistically significant improvement over control (+). In contrast, the combination of linolenic acid and inositol (in the presence of calcium nitrate) (treatment 4.3) exhibited a statistically significant improvement over the control (+) and over either active ingredient alone (in the presence of calcium nitrate. The efficacy of the combination was therefore unexpected.

The formulations above were also tested on tomato plants when applying at 1 lt/ha, 2 lt/ha, 3 lt/ha, 4 lt/ha and 5 lt/ha as a dose finding exercise. All doses produced similar results with that of 2 lt/ha providing the highest comparatively.

The ratio used (100 mg/lt inositol and 2.99 mg/lt LA) was chosen after tests on tomato plants using inositol at 10 mg/lt, 100 mg/lt and 500 mg/lt and LA at 0.084 mg/lt, 0.84 mg/lt and 4.2 mg/lt showed that the synergistic activity was retained at all doses and all ratios, with the highest results obtained when 100 mg/lt inositol was combined with 0.084 mg/lt LA. The other combinations were also superior to the ingredients on their own.

The formulations described above in Example 1 were also tested on tomato plants, and similar results were observed.

Example 3 (Strawberries)

The experiment was setup in a farm in south Lincolnshire. Standard farming practice was applied and the treatments were superimposed to that.

Appropriate replication and number of measurements were decided to ensure statistical conformity.

The strawberries grown hydroponically received 2 lt/ha (in 150 lt water/ha) of the formulation applied by foliar spraying 3 times at 12 days interval from flowering. Experienced pickers collected the ripe berries for analysis on the same day of harvest. The rotting test ran over 15 days with time lapse photography and calculating the percentage coverage of fungal growth.

The concentrations below indicate the concentration of each component in the diluted (150 litre) formulation. The concentration of linolenic acid is the amount required to apply a 100 nmol dose of linolenic acid per plant (based on 26,000 strawberry plants per hectare). The concentration of CaN is a result of diluting a 20 wt % CaN stock solution to 150 litres.

The results are reported in Table 5 and Table 6.

TABLE 5

| Treatment | Content (ai) | Conc. | Rot (%) |
|---|---|---|---|
| Control | Water | 100% | 65 |
| Treatment 5.1 | Inositol (IN) | 100 mg/lt | 58 |
| Treatment 5.2 | Linolenic Acid (LA) | 4.83 mg/lt | 60 |
| Treatment 5.3 | IN | 100 mg/lt | 23 |
| | LA | 4.83 mg/lt | |
| | | LSD | 9 |

The results of the trial reported in Table 5 show that strawberries treated with a combination of linolenic acid and inositol (treatment 5.3) exhibited significantly lower tendency to rot compared to strawberries treated with either linolenic acid and inositol alone (treatments 5.2 and 5.1 respectively). In particular, using linolenic acid and inositol alone (treatments 5.2 and 5.1 respectively) produced no statistically significant improvement over control. In contrast, the combination of linolenic acid and inositol (treatment 5.3) exhibited a statistically significant improvement over the control and over either active ingredient alone. The performance of the combination was therefore unexpected.

The concentrations below indicate the concentration of each component in the diluted (150 litre) formulation. The concentration of linolenic acid is the amount required to apply a 100 nmol dose of linolenic acid per plant (based on 26,000 strawberry plants per hectare). The concentration of CaN is a result of diluting a 20 wt % CaN stock solution to 150 litres.

TABLE 6

| Treatment | Content (ai) | Conc. | Rot (%) |
|---|---|---|---|
| Control (+) | Ca Nitrate 4H2O (CaN) | 0.13 wt % | 50 |
| Treatment 6.1 | CaN | 0.13 wt % | 53 |
| | IN | 100 mg/lt | |
| Treatment 6.2 | CaN | 0.13 wt % | 50 |
| | LA | 4.83 mg/lt | |
| Treatment 6.3 | CaN | 0.13 wt % | 28 |
| | IN | 100 mg/lt | |

TABLE 6-continued

| Treatment | Content (ai) | Conc. | Rot (%) |
|---|---|---|---|
| | LA | 4.83 mg/lt | |
| | | LSD | 9 |

Likewise, the results of the trial reported in Table 6 show that strawberries treated with a combination of linolenic acid and inositol (in the presence of calcium nitrate) (treatment 6.3) exhibited significantly lower tendency to rot compared to strawberries treated with either linolenic acid or inositol alone (in the presence of calcium nitrate) (treatments 6.2 and 6.1 respectively). In particular, using linolenic acid and inositol alone (in the presence of calcium nitrate) produced no statistically significant improvement over control (+). In contrast, the combination of linolenic acid and inositol (in the presence of calcium nitrate) (treatments 6.2 and 6.1 respectively) exhibited a statistically significant improvement over the control (+) and over either active ingredient alone. The performance of the combination was therefore unexpected.

The formulations above were also tested on strawberry plants when applying at 1 lt/ha, 2 lt/ha, 3 lt/ha, 4 lt/ha and 5 lt/ha as a dose finding exercise. All doses produced similar results with that of 2 lt/ha providing the highest comparatively.

The ratio used (100 mg/lt inositol and 4.83 mg/lt LA) was chosen after tests on strawberry plants using inositol at 10 mg/lt, 100 mg/lt and 500 mg/lt and LA at 0.483 mg/lt, 4.83 mg/lt and 24.15 mg/t showed that the synergistic activity was retained at all doses and all ratios, with the highest results obtained when 100 mg/lt inositol was combined with 4.83 mg/lt LA. The other combinations were also superior to the ingredients on their own.

The formulations described above in Example 1 were also tested on strawberry plants, and similar results were observed.

Example 4 (Potatoes)

Potatoes of the variety Maris Piper were cultivated as standard farm practice in Lincolnshire. Typical fertiliser and pesticide inputs were applied as blanket over all treatments. The treatments were superimposed on top of the standard practice.

Bruising: Uniform potato tubers were dropped from 1.5 m height. They were left for 10 days in a store at 22° C. to promote bruising and assessed by cutting in half and scoring the bruising with a scale from 1-10 (1=no bruising, 10=bruise with 2 cm diameter).

The results are reported in Table 7 and Table 8.

The concentrations below indicate the concentration of each component in the diluted (150 litre) formulation. The concentration of linolenic acid is the amount required to apply a 100 nmol dose of linolenic acid per plant (based on 24,000 potato plants per hectare). The concentration of CaN is a result of diluting a 20 wt % CaN stock solution to 150 litres.

TABLE 7

| Treatment | Content (ai) | Conc. | Bruising (1-10) |
|---|---|---|---|
| Control | Water | 100% | 7.5 |
| Treatment 7.1 | Inositol (IN) | 100 mg/lt | 6.8 |
| Treatment 7.2 | Linolenic Acid (LA) | 4.45 mg/lt | 7.0 |
| Treatment 7.3 | LA | 100 mg/lt | 3.7 |

TABLE 7-continued

| Treatment | Content (ai) | Conc. | Bruising (1-10) |
|---|---|---|---|
| | IN | 4.45 mg/lt | |
| | | LSD | 0.8 |

The results of the trial reported in Table 7 show that potatoes treated with a combination of linolenic acid and inositol (treatment 7.3) exhibited significantly lower tendency to bruise compared to potatoes treated with either linolenic acid or inositol alone (treatments 7.2 and 7.1 respectively). In particular, using linolenic acid and inositol alone (treatments 7.2 and 7.1 respectively) produced no statistically significant improvement over control. In contrast, the combination of linolenic acid and inositol (treatment 7.3) exhibited a statistically significant improvement over the control and over either active ingredient alone. The performance of the combination was therefore unexpected.

The concentrations below indicate the concentration of each component in the diluted (150 litre) formulation. The concentration of linolenic acid is the amount required to apply a 100 nmol dose of linolenic acid per plant (based on 24,000 potato plants per hectare). The concentration of CaN is a result of diluting a 20 wt % CaN stock solution to 150 litres.

TABLE 8

Experiment on potatoes (Ca)

| Treatment | Content (ai) | Conc. | Bruising (1-10) |
|---|---|---|---|
| Control (+) | Ca Nitrate 4H2O (CaN) | 0.13 wt % | 7.5 |
| Treatment 8.1 | CaN | 0.13 wt % | 6.7 |
| | IN | 100 mg/lt | |
| Treatment 8.2 | CaN | 0.13 wt % | 6.3 |
| | LA | 4.45 mg/lt | |
| Treatment 8.3 | CaN | 0.13 wt % | 3.8 |
| | IN | 100 mg/lt | |
| | LA | 4.45 mg/lt | |
| | | LSD | 0.8 |

Likewise, the results of the trial reported in Table 8 show that potatoes treated with a combination of linolenic acid and inositol (in the presence of calcium nitrate) (treatment 8.3) exhibited significantly lower tendency to bruise compared to potatoes treated with either linolenic acid or inositol alone (in the presence of calcium nitrate) (treatments 8.2 and 8.1 respectively). In particular, using inositol alone (in the presence of calcium nitrate) (treatment 8.1) produced no statistically significant improvement over control (+). In contrast, the combination of linolenic acid and inositol (in the presence of calcium nitrate) (treatment 8.3) exhibited a statistically significant improvement over the control (+) and over either active ingredient alone. Furthermore, the magnitude of the improvement exhibited by the combination of linolenic acid and inositol (in the presence of calcium nitrate) (treatment 8.3) with respect to the improvement exhibited by inositol (in the presence of calcium nitrate) (treatment 8.2) proves that there is an unexpected improvement with the combination of treatment 8.3.

The formulations above were also tested on potato plants when applying at 1 lt/ha, 2 lt/ha, 3 lt/ha, 4 lt/ha and 5 lt/ha as a dose finding exercise. All doses produced similar results with that of 2 lt/ha providing the highest comparatively.

The ratio used (100 mg/lt inositol and 4.45 mg/lt LA) was chosen after tests on potato plants using inositol at 10 mg/lt, 100 mg/lt and 500 mg/lt and LA at 0.445 mg/lt, 4.45 mg/lt and 22.25 mg/lt showed that the synergistic activity was retained at all doses and all ratios, with the highest results obtained when 100 mg/lt inositol was combined with 4.45 mg/lt LA. The other combinations were also superior to the ingredients on their own.

The formulations described above in Example 1 were also tested on potato plants, and similar results were observed.

Example 5

The following treatments were tested on mechanically planted lettuce for uniformity. Water loss (%) was measured as an indicator of shelf-life. The shelf-life of the lettuce was measured by allowing a harvested lettuce (cut in half) to dry at ambient temperature for 72 hours. The weight of the lettuce was measured before and after drying, and the weight loss calculated; this represents water loss. 10 replicates were used for each treatment and the plants were under controlled greenhouse condition to avoid external parameters affecting the results. Distilled water was used for all treatments. Samples were collected 5 days after application.

The results are reported in Table 9.

The concentrations below indicate the concentration of each component in the diluted (150 litre) formulation. The concentration of linolenic acid is the amount required to apply a 100 nmol dose of linolenic acid per plant (based on 16,000 lettuce plants per hectare). The concentration of CaN is a result of diluting a 20 wt % CaN stock solution to 150 litres.

TABLE 9

Experiments on lettuce

| Treatment | Content (ai) | Conc. | Water loss (%) |
|---|---|---|---|
| Control | Water | 100% | 21.3 |
| Treat 9.1 | CaN | 0.13 wt % | 18.7 |
| Treat 9.2 | Inositol Phosphate | 150 mg/lt | 21.1 |
| Treat 9.3 | Linolenate | 33 mg/lt | 19.4 |
| Treat 9.4 | CaN | 0.13 wt % | 17.4 |
| | Inositol Phosphate | 150 mg/lt | |
| Treat 9.5 | CaN | 0.13 wt % | 14.5 |
| | Inositol Phosphate | 150 mg/lt | |
| | LA | 33 mg/lt | |
| Treat 9.6 | CaN | 0.13 wt % | 19.7 |
| | Linolenate | 33 mg/lt | |
| Treat 9.7 | CaN | 0.13 wt % | 14.9 |
| | Inositol Phospahte | 150 mg/lt | |
| | Linolenate | 33 mg/lt | |
| Treat 9.8 | CaN | 0.13 wt % | 14.8 |
| | Myo-Inositol | 150 mg/lt | |
| | Linolenate | 33 mg/lt | |
| Treat 9.9 | Inositol Phosphate | 150 mg/lt | 19.9 |
| | Linolenate | 33 mg/lt | |
| | | LSD | 2.3 |

The invention claimed is:
1. An agrochemical combination of:
(i) a compound selected from the group consisting of formula 6 and formula 7:

Formula 6

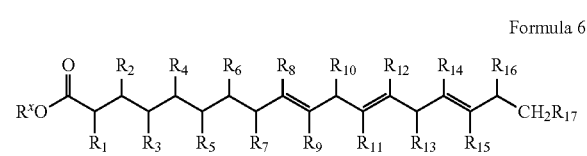

-continued

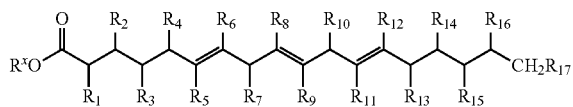
Formula 7 wherein:
$R_{1-17}$; and
$R^x$ are each independently selected from the group consisting of H, and ethyl;
(ii) a compound represented by formula 8:

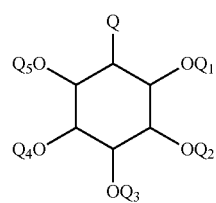
Formula 8 wherein Q is $OQ_6$; and
wherein each Q1-Q6 is independently selected from the group consisting of H and; and
(iii) a source of calcium being calcium nitrate; and
wherein the weight ratio of component (i) to component (ii) is from about 1:2 to about 1:140.

2. The combination according to claim 1, wherein component (i) is α-linolenic acid or γ-linolenic acid.

3. The combination according to claim 1, wherein component (ii) is inositol.

4. The combination according to claim 1, wherein the combination comprises (i) linolenic acid, and (ii) inositol.

5. An agrochemical composition comprising a combination as defined in claim 1.

6. A method of improving crop yield and/or crop quality characteristics, comprising:
applying an agrochemical combination as defined in claim 1 to a plant.

7. The method of claim 6, wherein improving crop yield and/or crop quality characteristics comprises:
(a) improving shelf life of a crop;
(b) improving stress tolerance of a crop;
(c) increasing fresh and dry matter content of a crop;
(d) improving fruit conformity; and/or
(e) increasing tolerance of a crop to disease.

8. The agrochemical composition according to claim 5, comprising:
(i) linolenic acid; and
(ii) inositol.

9. The agrochemical composition according to claim 5, comprising:
(i) linolenic acid, or a $C_2$ alkyl ester thereof; and
(ii) inositol or inositol phosphate.

10. The combination according to claim 1, wherein a weight ratio of component (i) to the source of calcium is from about 1:4,000 to about 1:550,000.

11. The combination according to claim 1, wherein a weight ratio of component (ii) to the source of calcium is from about 1:500 to about 1:4,000.

12. The agrochemical composition according to claim 5, wherein a concentration of component (i) is from about 10 mg/litre (mg/l) to about 500 mg/l.

13. The agrochemical composition according to claim 5, wherein a concentration of component (ii) is from about 10 mg/litre (mg/l) to about 500 mg/l.

14. An agrochemical combination of:
(i) a compound selected from the group consisting of formula 6 and formula 7;

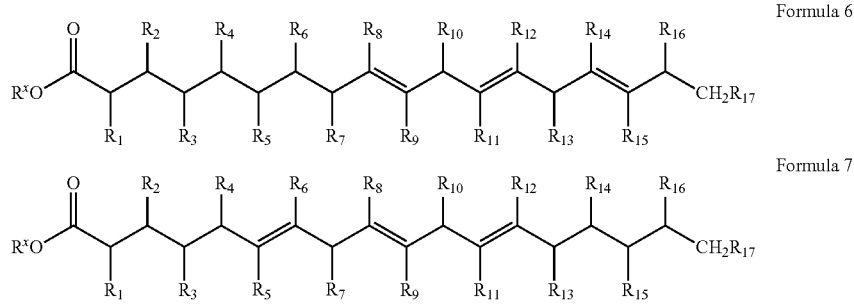

wherein:
$R_{1-17}$; and
$R^x$ are each independently selected from the group consisting of H, and ethyl;
(ii) a compound represented by formula 8:

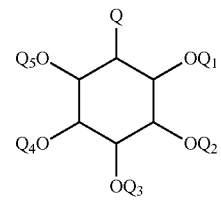
Formula 8 wherein Q is $OQ_6$; and
wherein each Q1-Q6 is independently selected from: the group consisting of H and $PO_3H_2$; and
wherein the concentration of component (i) is about 1 mg/l, about 4.5 mg/l, about 4.9 mg/l, about 30 mg/l, or about 33 mg/l; and
wherein the concentration of component (ii) is about 100 mg/l or about 150 mg/l.

15. The agrochemical combination according to claim 1, wherein the concentration of component (i) is about 1 mg/l, about 4.5 mg/l, about 4.9 mg/l, or about 30 mg/l; and wherein the concentration of component (ii) is about 100 mg/l.

16. The agrochemical combination according to claim 14, wherein the concentration of component (i) is about 1 mg/l, about 4.5 mg/l, about 4.9 mg/l, or about 30 mg/l; and wherein the concentration of component (ii) is about 100 mg/l.

17. The agrochemical combination according to claim 1, wherein the concentration of component (i) is about 33 mg/l; and wherein the concentration of component (ii) is about 150 mg/l.

18. The agrochemical combination according to claim 14, wherein the concentration of component (i) is about 33 mg/l; and wherein the concentration of component (ii) is about 150 mg/l.

19. The agrochemical combination according to claim 14, wherein the combination comprises (iii) a source of calcium selected from the group consisting of calcium ammonium nitrate, calcium nitrate, calcium hydroxide, calcium cyanamide, calcium acetate, calcium acetylsalicylate, calcium borate, calcium borogluconate, calcium carbonate, calcium chloride, calcium citrate, calcium ferrous citrate, calcium glycerophosphate, calcium lactate, calcium oxide, calcium pantothenate, calcium propionate, calcium saccharate, calcium sulphate, calcium phosphate and calcium tartrate.

20. The agrochemical combination according to claim 1, wherein the concentration of the source of calcium is from about 0.1 wt % to about 0.2 wt %.

21. The agrochemical combination according to claim 19, wherein the concentration of the source of calcium is from about 0.1 wt % to about 0.2 wt %.

* * * * *